United States Patent
Kim et al.

(10) Patent No.: US 6,819,391 B2
(45) Date of Patent: Nov. 16, 2004

(54) LIQUID CRYSTAL DISPLAY PANEL HAVING DUMMY COLUMN SPACER WITH OPENED PORTION

(75) Inventors: Jong Woo Kim, Kyongsangbuk-do (KR); Sung Chun Kang, Kyongsangbuk-do (KR); Young Hun Ha, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 56 days.

(21) Appl. No.: 10/150,968

(22) Filed: May 21, 2002

(65) Prior Publication Data

US 2003/0103185 A1 Jun. 5, 2003

(30) Foreign Application Priority Data

Nov. 30, 2001 (KR) ........................................ 2001-75459
Dec. 14, 2001 (KR) ........................................ 2001-79429
Apr. 4, 2002 (KR) ........................................ 2002-18460

(51) Int. Cl.⁷ ..................... G02F 1/1339; G02F 1/1341
(52) U.S. Cl. ..................... 349/157; 349/156; 349/189
(58) Field of Search .................. 349/159, 157, 349/189, 190

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. ........... 29/592 R |
| 4,653,864 A | 3/1987 | Baron et al. |
| 4,691,995 A | 9/1987 | Yamazaki et al. ....... 350/331 R |
| 4,775,225 A | 10/1988 | Tsuboyama et al. |
| 5,247,377 A | 9/1993 | Omeis et al. ................. 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe ................................. 141/7 |
| 5,539,545 A | 7/1996 | Shimizu et al. |
| 5,548,429 A | 8/1996 | Tsujita |
| 5,642,214 A | 6/1997 | Ishii et al. .................... 349/96 |
| 5,680,189 A | 10/1997 | Shimizu et al. |
| 5,742,370 A | 4/1998 | Kim et al. .................. 349/124 |
| 5,757,451 A | 5/1998 | Miyazaki et al. |
| 5,777,713 A * | 7/1998 | Kimura ...................... 349/156 |
| 5,831,710 A * | 11/1998 | Colgan et al. .............. 349/156 |

(List continued on next page.)

FOREIGN PATENT DOCUMENTS

| | | |
|---|---|---|
| EP | 1 003 066 A1 | 5/2000 |
| JP | 51-65656 | 6/1976 |
| JP | 9-281511 | 10/1977 |
| JP | 51-65656 | 12/1977 |
| JP | 52-149725 | 12/1977 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |

(List continued on next page.)

Primary Examiner—Tarifur R. Chowdhury
Assistant Examiner—Andrew Schechter
(74) Attorney, Agent, or Firm—Morgan, Lewis & Bockius, LLP

(57) ABSTRACT

A liquid crystal display panel and method for fabricating the same are disclosed in the present invention. The liquid crystal display panel includes first and second substrates facing into each other, a column spacer in a pixel region between the substrates, a dummy column spacer formed in a dummy region between the substrates, the dummy column spacer having an opened portion in at least one of corner-regions, a UV sealant formed outside the dummy column spacer between the substrates, and a liquid crystal layer between the substrates.

12 Claims, 14 Drawing Sheets

U.S. PATENT DOCUMENTS

| | | | |
|---|---|---|---|
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,905,558 A * | 5/1999 | Tokunaga et al. | 349/149 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | Von Gutfeld et al. | 349/187 |
| 6,163,357 A * | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,411,360 B1 * | 6/2002 | Matsuyama et al. | 349/156 |
| 6,414,733 B1 | 7/2002 | Ishikawa et al. | 349/110 |
| 6,542,215 B2 * | 4/2003 | Lee et al. | 349/153 |
| 2001/0021000 A1 | 9/2001 | Egami | 349/187 |

FOREIGN PATENT DOCUMENTS

| | | |
|---|---|---|
| JP | 61-55625 | 3/1986 |
| JP | 5-154923 A | 6/1993 |
| JP | 6-235925 A | 8/1994 |
| JP | 6-313870 A | 11/1994 |
| JP | 7-84268 A | 3/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 A | 6/2000 |

* cited by examiner

LIQUID CRYSTAL DISPLAY PANEL HAVING DUMMY COLUMN SPACER WITH OPENED PORTION

This application claims the benefit of the Korean Application Nos. P2001-75459 filed on Nov. 30, 2001, P2001-79429 filed on Dec. 14, 2001, and P2002-18460 filed on Apr. 4, 2002, which are hereby incorporated by reference.

BACKGROUND OF THE INVENTION

1. Field of the Invention

The present invention relates to a liquid crystal display, and more particularly, to a liquid crystal display panel and method for fabricating the same by a liquid crystal dropping method.

2. Discussion of the Related Art

A thin flat panel display tends to have a thickness of no more than a few centimeters. Particularly, a liquid crystal display (LCD) has a wide scope of applications, such as notebook computers, computer monitors, gauge monitors for space crafts, and air crafts, and the like.

Referring to FIG. 1, an LCD is provided with a lower substrate 1 having a plurality of thin film transistors and pixel electrodes formed thereon, an upper substrate 3 facing into the lower substrate 1 having a black matrix (BM), a color filter layer, and a common electrode, and a liquid crystal layer 5 between the two substrates 1 and 3. A sealant 7 is formed between the lower and upper substrates 1 and 3, to bond the substrates and prevent the liquid crystal from leaking.

In the foregoing LCD, a vacuum injection method has been used for forming the liquid crystal layer between the lower substrate 1 and the upper substrate 3. In such a method, after the lower substrate 1 and the upper substrate 3 are bonded together, a liquid crystal is injected between the two substrates by using capillary phenomenon and a pressure difference. However, the vacuum injection method takes much time to fill the liquid crystal between the substrates. As a result, productivity is much reduced as the substrate becomes large. Consequently, a method called a liquid crystal dropping method is suggested for solving such a problem. A method for fabricating an LCD panel by using a related art liquid crystal dropping method will be explained with reference to the attached drawings.

FIGS. 2A to 2D illustrate perspective views showing a method for fabricating an LCD panel by using a related art liquid crystal dropping method. For convenience, only one unit cell is illustrated in the drawings.

Referring to FIG. 2A, a lower substrate 1 and an upper substrate 3 are prepared for the process. A plurality of gate lines and data lines (both not shown) are formed on the lower substrate 1 to cross each other defining pixel regions. A thin film transistor is formed at every crossing point of the gate lines and the data lines. A pixel electrode is formed at every pixel regions connected to the thin film transistor.

A black matrix is formed on the upper substrate 3 for shielding a light leakage from the gate lines, the data lines, and the thin film transistors regions. A color filter layer of red, green, and blue is formed thereon. A common electrode is formed thereon in this order. An alignment film is formed on both of the lower substrate 1 and the upper substrate 3 for an initial orientation of the liquid crystal.

Referring to FIG. 2B, a sealant 7 is coated on the lower substrate 1, and a liquid crystal 5 is dropped thereon to form a liquid crystal layer. Then, spacers (not shown) are spread on the upper substrate 3 for maintaining a cell gap. The spacers may be ball spacers spread on the substrate, or column spacers attached to the substrate.

In the liquid crystal dropping method, the liquid crystal layer is placed between the attached substrates before hardening a sealant. Accordingly, if a thermo-hardening sealant is used to bond the substrates, it may flow and contaminate the liquid crystal during the heating process. Thus, a UV sealant has to be used as a sealant to avoid such a problem.

Referring to FIG. 2C, the lower substrate 1 and the upper substrate 3 are attached to each other. Referring to FIG. 2D, a UV ray is irradiated by using a UV irradiating device 9, to harden the sealant 7 (shown in FIG. 1B), thereby bonding the lower substrate 1 and the upper substrate 3. Then, the bonded substrates 1 and 3 are cut into a unit cell (not shown). A final inspection is carried out.

Thus, the liquid crystal dropping method takes less time period than the vacuum injection method because the liquid crystal 5 is directly dropped onto the lower substrate 1 before the substrates 1 and 3 are bonded.

However, the related art liquid crystal dropping method has the following disadvantages caused by difficulty in determining an accurate amount of the liquid crystal depending upon a size of the substrate and a cell gap between the substrates.

First, if a dropped amount of the liquid crystal is less than the required amount, regions of the substrate for the liquid crystal are filled imperfectly. Particularly, there occur at four corners located farthest from the center of the substrate. These deteriorate uniformity of the cell gap and picture characteristics.

Second, if the liquid crystal is dropped excessively, the liquid crystal comes into contact with the sealant before the sealant is hardened. Thus, the liquid crystal is contaminated.

Third, even if the liquid crystal is dropped appropriately, it takes time to spread the liquid crystal from the center part of the substrate to the corners, the farthest spots. Accordingly, if the imperfectly filled region occurs as the liquid crystal is not spread to the corner-regions, a final inspection cannot be carried out.

SUMMARY OF THE INVENTION

Accordingly, the present invention is directed to a liquid crystal display panel and a method for fabricating the same that substantially obviates one or more of problems due to limitations and disadvantages of the related art.

Another object of the present invention is to provide a liquid crystal display panel and a method for fabricating the same to have a uniform cell gap and improved picture characteristics.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes first and second substrates facing into each other, a column spacer in a pixel region between the substrates, a dummy column spacer formed in a dummy region between the substrates, the dummy column spacer having an opened portion in at least one of corner-regions, a UV sealant formed outside the dummy column spacer between the substrates, and a liquid crystal layer between the substrates.

In another aspect of the present invention, a liquid crystal display panel includes first and second substrates, a plurality of gate lines and data lines on the first substrate to cross each other defining a pixel region, a thin film transistor at each crossed point of the gate lines and the data lines, a pixel electrode in the pixel region, a black matrix on the second substrate, a color filter layer on the black matrix, a third layer on the color filter layer, a column spacer on the third layer over a region vertically overlapping the gate lines and the data lines, a dummy column spacer on a third layer in the dummy region, the dummy column spacer having an opened portion in at least one of corner-regions, a UV sealant outside the dummy column spacer between the substrates, and a liquid crystal layer between the substrates.

In a further aspect of the present invention, a method for fabricating a liquid crystal display panel includes forming a column spacer and a dummy column spacer on a first substrate, the column spacer being formed in a pixel region and the dummy column spacer being formed in a dummy region, forming a UV sealant outside the dummy column spacer, dropping a liquid crystal on the second substrate, attaching the first and second substrates, and irradiating a UV ray on the attached substrates.

As explained, since a dropping amount of the liquid crystal in the related art liquid crystal dropping method is not easily controllable, the liquid crystal may not be filled properly in the active region where a picture is reproduced.

Accordingly, the present invention suggests dropping more than an amount of liquid crystal measured according to a cell gap and a substrate size for preventing imperfect filling, and forming a dummy column spacer in the dummy region to regulate a liquid crystal flow, for preventing imperfect or excessive filling of the liquid crystal.

Moreover, the regulation of the liquid crystal flow by the dummy column spacer solves the problem of the contamination of the liquid crystal by the contact with the UV sealant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
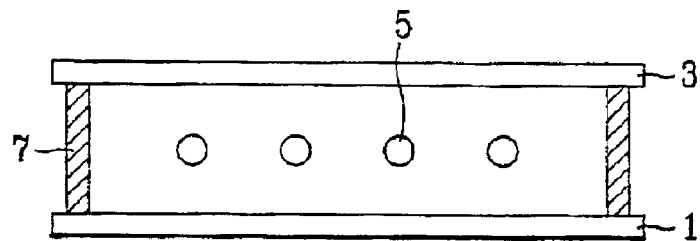
FIG. 1 illustrates a cross-sectional view of a related art LCD panel.
Figure 2A:
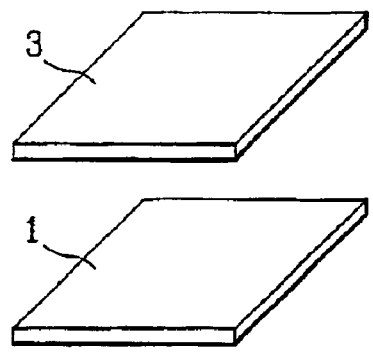
FIGS. 2A to 2D are perspective views illustrating a method for fabricating an LCD panel using a related art liquid crystal dropping method.
Figure 2B:
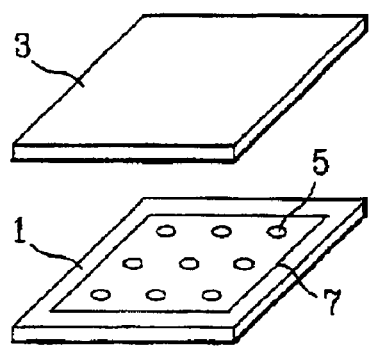
Figure 2C:
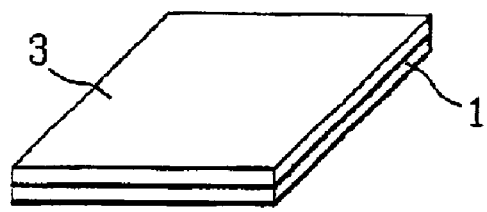
Figure 2D:
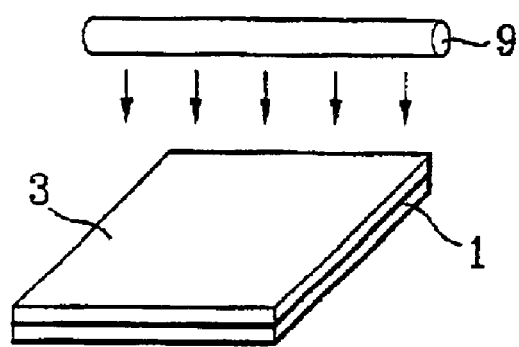
Figure 3:
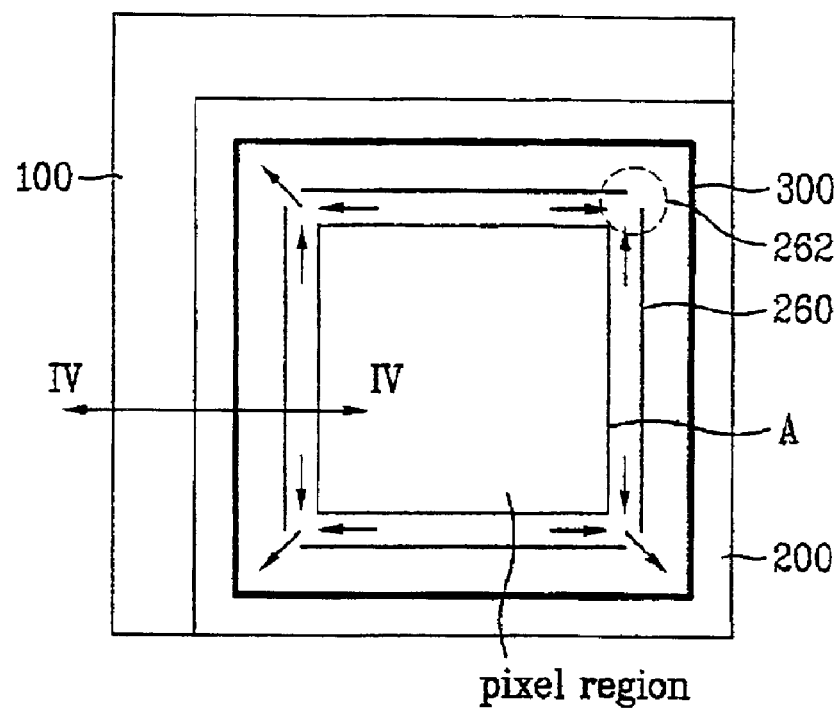
FIG. 3 illustrates a plane view of an LCD panel in accordance with a first embodiment of the present invention.

FIG. 3 illustrates a plane view of an LCD panel in accordance with a first embodiment of the present invention.

Referring to FIG. 3, the LCD panel includes a lower substrate 100, an upper substrate 200, and a UV sealant 300 between the substrates 100 and 200. Column spacers (not shown) are formed in a pixel region (a line 'A' represents an imaginary line for indicating a pixel region), and a dummy column spacer 260 is formed inside the UV sealant 300 in the dummy region to regulate a liquid crystal flow. A liquid crystal layer (not shown) is formed between the lower and upper substrates 100 and 200. The column spacer serves to maintain a cell gap between the lower substrate 100 and the upper substrate 200.

More specifically, the dummy column spacer 260 has a height the same as the column spacer, and an opened portion 262 in at least one of the corner-regions. Although the drawing shows that the opened portion 262 is formed at all four corners, the number of the opened portion 262 may be varied. Alternatively, the opened portion 262 may not be formed at all. The dummy column spacer 260 serves as a liquid crystal flow passage, thereby uniformly filling the liquid crystal throughout the cell, and preventing the liquid crystal from being contaminated by the UV sealant 300. That is, as shown in arrows in the drawing, since the liquid crystal flows along the dummy column spacer 260, and to the corner-region of the substrate through the opened portion 262, the liquid crystal in the corner-regions of the substrates is uniformly spread throughout the substrate. Moreover, the dummy column spacer 260 without the opened portion 262 serves as a dam for preventing the liquid crystal from contacting the UV sealant and being contaminated by the UV sealant.

Variations of the first embodiment of the present invention will be explained with reference to FIGS. 4A to 4C, which are cross-sectional views taken along line IV—IV of FIG. 3 (a region having no opened portion 262 is formed in the dummy column spacer 260) illustrating other embodiments.

Figure 4A:
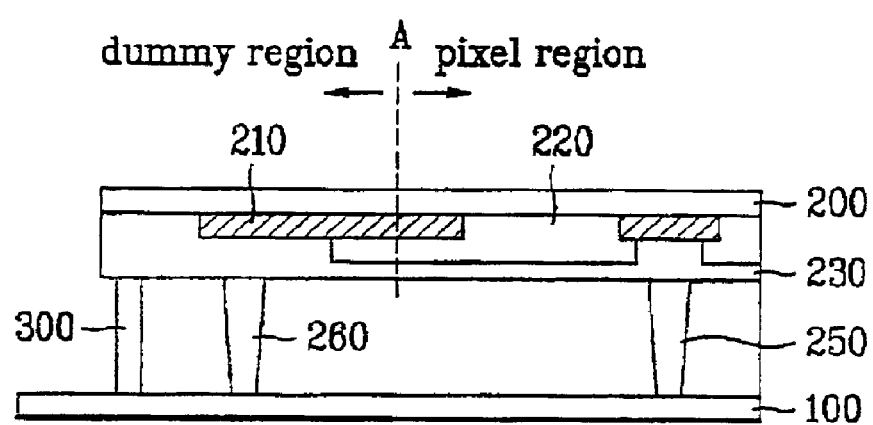
FIGS. 4A to 4C are cross-sectional views taken along line IV—IV of FIG. 3.

Referring to FIG. 4A, a black matrix 210, a color filter layer 220, and a common electrode 230 are formed on the upper substrate 200 in this order. Gate lines, data lines, thin film transistors, and pixel electrodes (all not shown) are formed on the lower substrate 100. A plurality of column spacers 250 are formed in the pixel region on the upper substrate 200 each having a height of the cell gap. Since the column spacers 250 are formed in regions of the gate lines and the data lines, the column spacers 250 are formed on the common electrode 230 over the black matrix 210 on the upper substrate 200. A dummy column spacer 260 is formed in the dummy region on the upper substrate 200 with a height the same as the column spacer 250. The dummy column spacer may be formed in any region except for the pixel region as far as the region is within the dummy region on the inner side of the UV sealant 300. Although the drawing shows that the dummy column spacer 260 is formed on the common electrodes 230 without an underlying color filter layer 220, the dummy column spacer 260 may be formed on the common electrodes 230 with the underlying color filter layer 220. For example, the column spacer 250 and the dummy column spacer 260 may be formed of a photosensitive resin.

In the meantime, an overcoat layer may be additionally formed between the color filter layer 220 and the common electrode 230 on the upper substrate 200, and alignment layers may be formed on the upper substrate 200 inclusive of the column spacers 260 and the lower substrate 100, respectively.

Figure 4B:
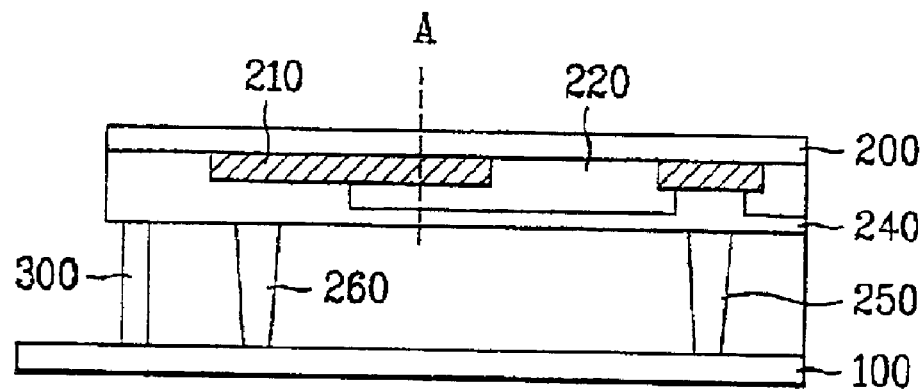

FIG. 4B illustrates a cross-sectional view of an LCD panel in accordance with another variation of the first embodiment of the present invention. In this embodiment, instead of the common electrode 230, the overcoat layer 240 is formed on the upper substrate 200 in the foregoing LCD panel, shown in FIG. 4A.

The LCD panel in FIG. 4B is called an in-plane switching (IPS) mode LCD panel, and has a common electrode formed on the lower substrate 100. Therefore, the IPS mode LCD panel is the same as the LCD panel in FIG. 4A, except for that the column spacer 250 and the dummy column spacer 260 are formed on the overcoat layer 240.

Figure 4C:
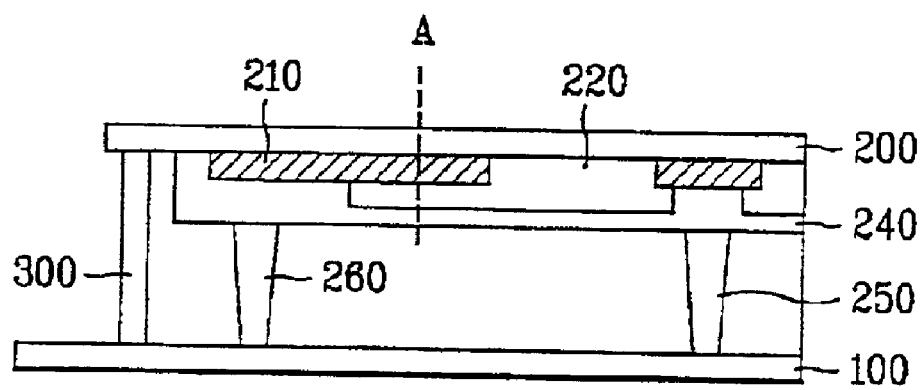

FIG. 4C illustrates a cross-sectional view of an LCD panel in accordance with another embodiment of the present invention. In the LCD panel in FIG. 4B, the overcoat layer 240 is patterned such that it is formed on the black matrix 210 and not on the sealant 300. The others are similar to the LCD panel in FIG. 4B.

Figure 5:
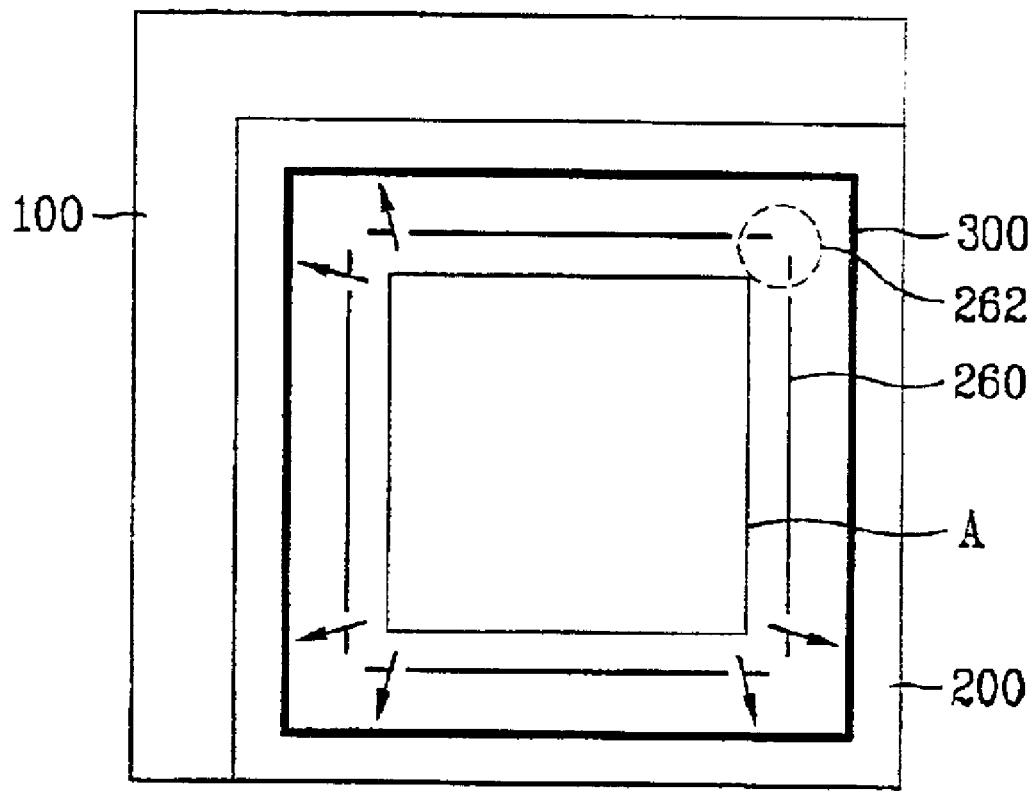
FIG. 5 illustrates a plane view of an LCD panel in accordance with a second embodiment of the present invention.

FIG. 5 illustrates a plane view of an LCD panel in accordance with a second embodiment of the present invention.

Referring to FIG. 5, the LCD panel according to the second embodiment of the present invention includes a dummy column spacer 260 having an opened portion 262. The opened portion 262 includes a plurality of openings in each corner-region of the substrate.

The opened portion 262 including a plurality of openings permits a liquid crystal to easily flow to the corners of the substrate, and allows a uniform filling of the liquid crystal. The opened portion 262 may be formed in at least one of the corner-regions. A plurality of openings may be formed at either a constant interval or an irregular interval. The others are similar to the first embodiment.

Figure 6:
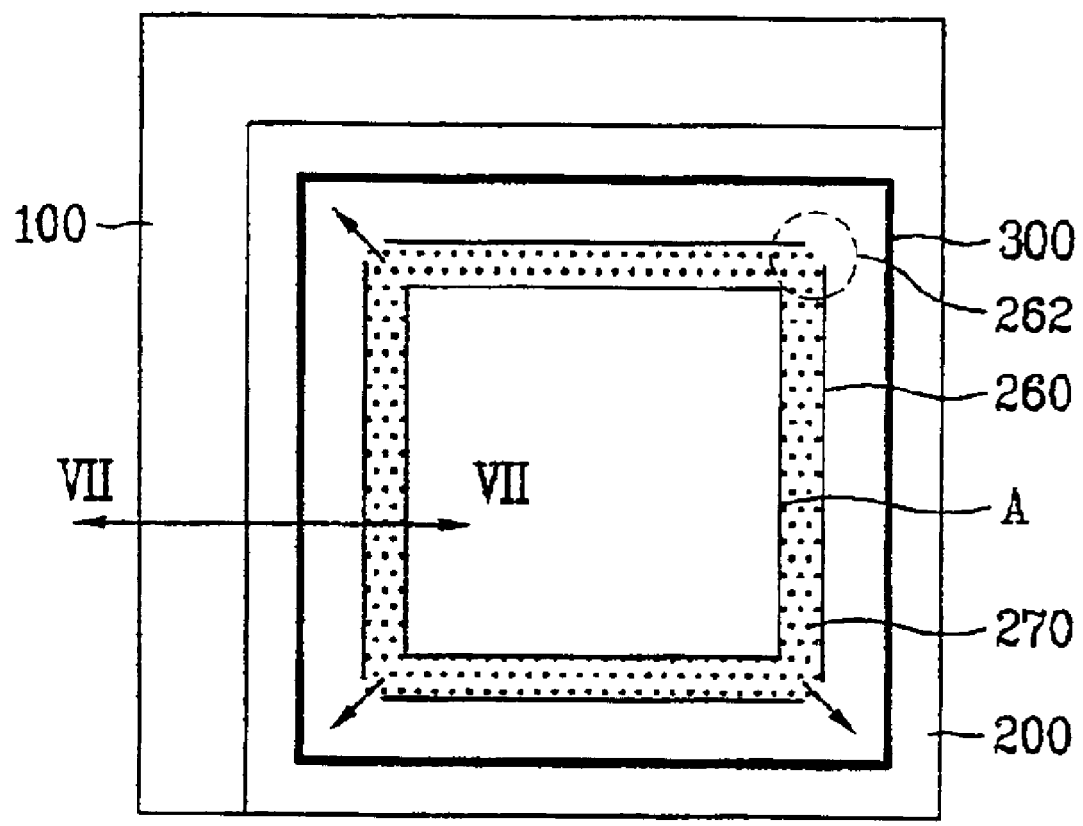
FIG. 6 illustrates a plane view of an LCD panel in accordance with a third embodiment of the present invention.

FIG. 6 illustrates a plane view of an LCD panel in accordance with a third embodiment of the present invention.

Referring to FIG. 6, the LCD panel includes a lower substrate 100, an upper substrate 200, and a UV sealant 300 between the lower and upper substrates 100 and 200. A plurality of column spacers (not shown) are formed in a pixel region (a line 'A' represents an imaginary line for indicating the pixel region), and a dummy column spacer 260 is formed on inside the UV sealant 300 in the dummy region to regulate a liquid crystal flow. The dummy column spacer 260 is formed at a height the same as the column spacer and has an opened portion 262 in at least one of the corner-regions. The opened portion 262 may not be formed at all. Also, a dotted line type dummy column spacer 270 may be additionally formed at the inner dummy region of the dummy column spacer 260 for assisting the regulation of the liquid crystal flow. A liquid crystal layer (not shown) is formed between the substrates 100 and 200.

The additional dotted line type dummy column spacer 270 inside the dummy column spacer 260 facilitates more smooth regulation of the liquid crystal flow because the liquid crystal flows along spaces of not only the dummy column spacer 260, but also the dotted line type column spacer 270.

Variations of this embodiment of the present invention will be explained in detail with reference to FIGS. 7A to 7C, which are cross-sectional views taken along line VII—VII of FIG. 6 (a region having no opened portion 262 in the dummy column spacer 260).

Figure 7A:
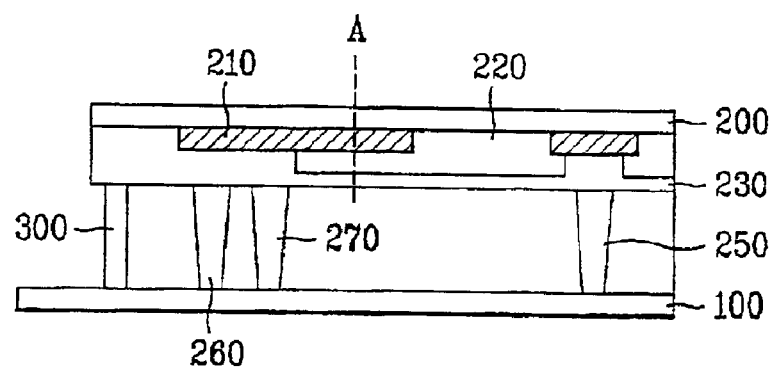
FIGS. 7A to 7C are cross-sectional views taken along line VII—VII of FIG. 6.

Referring to FIG. 7A, a black matrix 210, a color filter layer 220, and a common electrode 230 are formed on the upper substrate 200 in this order. A plurality of gate lines, data lines, thin film transistors, and pixel electrodes (all not shown) are formed on the lower substrate 100. Column spacers 250 are formed in the pixel region on the upper substrate 200 each having a height of the cell gap. The dummy column spacer 260 is formed in the dummy region on the upper substrate 200 with a height the same as the column spacer 250. The dotted line type dummy column spacer 270 is formed in the dummy region inside the dummy column spacer 260 with a height the same as the column spacer 250. Although only one dotted line type dummy column spacer 270 is shown in FIG. 7A, there may be a plurality of the dotted line type column spacers 270. The dotted line type dummy column spacer 270 may be formed in any region as far as the region is within the dummy region. For example, the column spacer 250, the dummy column spacer 260, and the dotted line type dummy column spacer 270 may be formed of a photosensitive resin.

In the meantime, an overcoat layer may be additionally formed between the color filter layer 220 and the common electrode 230 on the upper substrate 200, and alignment films (not shown) are formed on the upper substrate 200 inclusive of the column spacers 260 and the dotted line type dummy column spacer 270, and the lower substrate 100, respectively.

Figure 7B:
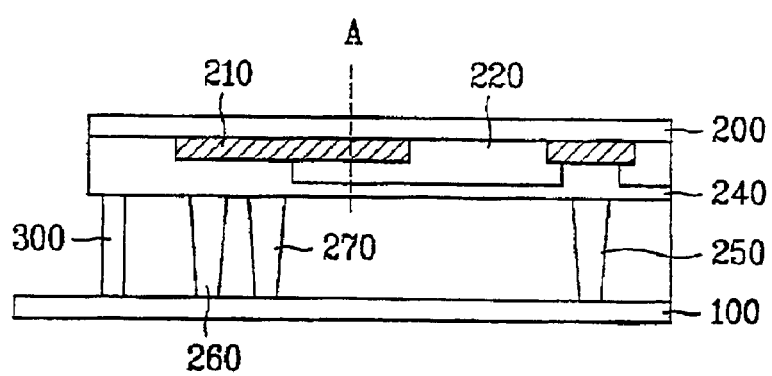

FIG. 7B illustrates a cross-sectional view of an LCD panel in accordance with another variation of the third embodiment of the present invention, wherein, in the foregoing LCD panel in FIG. 7A, not the common electrode 230, but the overcoat layer 240, is formed on the upper substrate 200. The LCD panel in FIG. 7B is called an IPS mode LCD panel, and has the common electrode formed on the lower substrate 100. Therefore, the IPS mode LCD panel is similar to the LCD panel in FIG. 7A, except for that the column spacer 250, the dummy column spacer 260, and the dotted line type dummy column spacer 270 are formed on the overcoat layer 240.

Figure 7C:
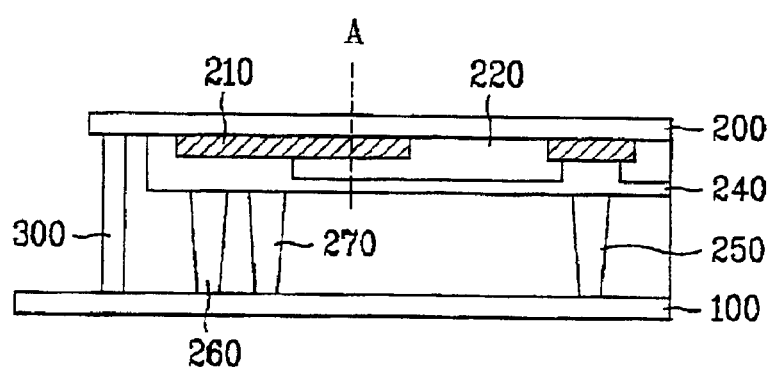

FIG. 7C illustrates a cross-sectional view of an LCD panel in accordance with another variation of the third embodiment of the present invention. In this embodiment, the overcoat layer 240 is patterned such that the sealant 300 is formed directly on the upper substrate. Others are similar to the LCD panel in FIG. 7B.

Figure 8:
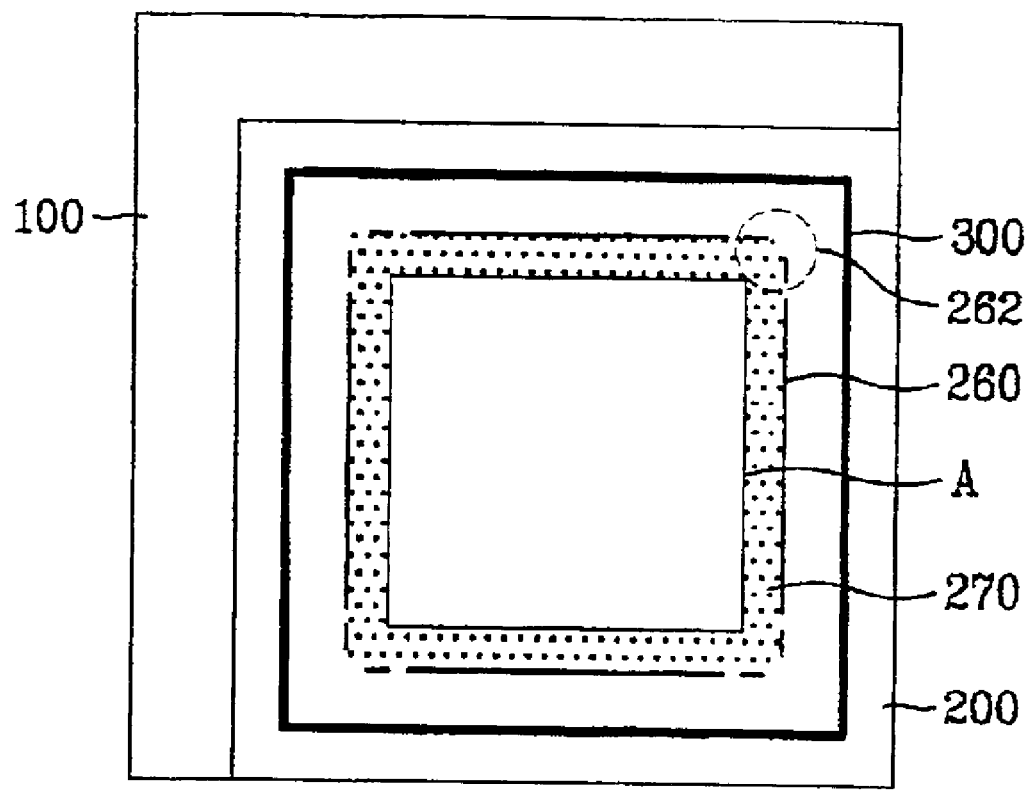
FIG. 8 illustrates a plane view of an LCD panel in accordance with a fourth embodiment of the present invention.

FIG. 8 illustrates a plane view of an LCD panel in accordance with a fourth embodiment of the present invention.

Referring to FIG. 8, the LCD panel according to the fourth embodiment of the present invention includes a dummy column spacer 260 having an opened portion 262. The opened portion 262 includes a plurality of openings in the corner-region of the substrate.

The opened portion 262 may be formed in at least one of the corner-regions. A plurality of openings may be formed at either a constant interval or an irregular interval. The others are similar to the third embodiment.

Figure 9:
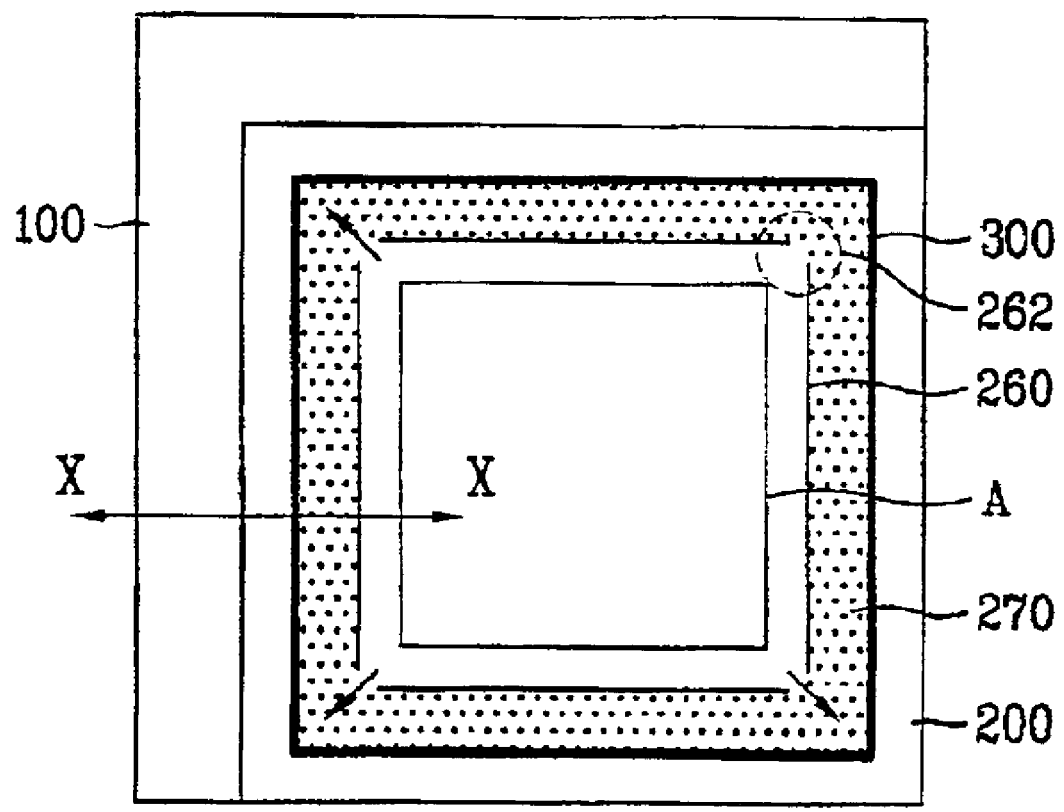
FIG. 9 illustrates a plane view of an LCD panel in accordance with a fifth embodiment of the present invention.
Figure 10A:
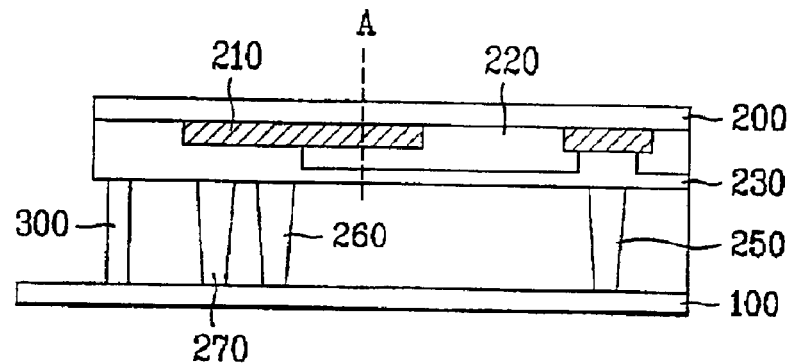
FIGS. 10A to 10C are cross-sectional views taken along line X—X of FIG. 9.
Figure 10B:
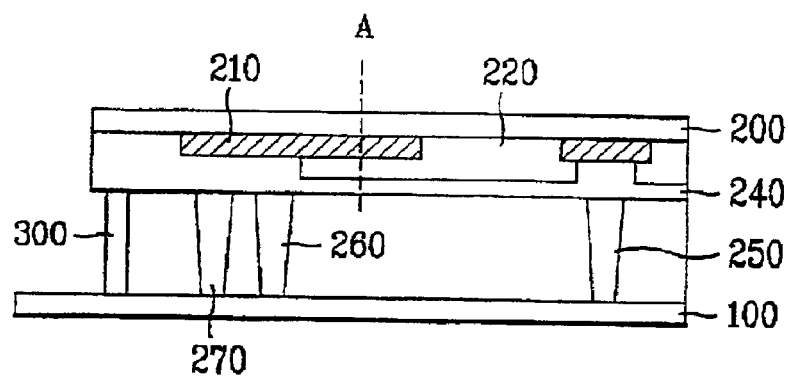
Figure 10C:
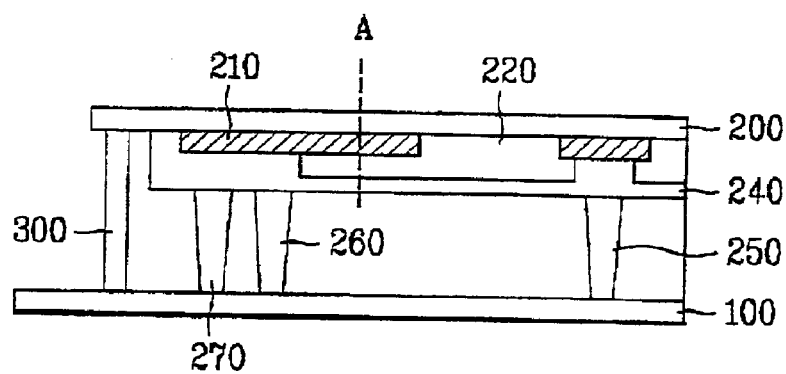

FIG. 9 illustrates a plane view of an LCD panel in accordance with a fifth embodiment of the present invention. In this embodiment, a dotted line type dummy column spacer 270 is formed outside the dummy column spacer 260. Since the others are similar to the third embodiment, detailed descriptions are omitted for simplicity. FIGS. 10A to 10C illustrate cross-sectional views taken along line X—X of FIG. 9 for variations.

Figure 11:
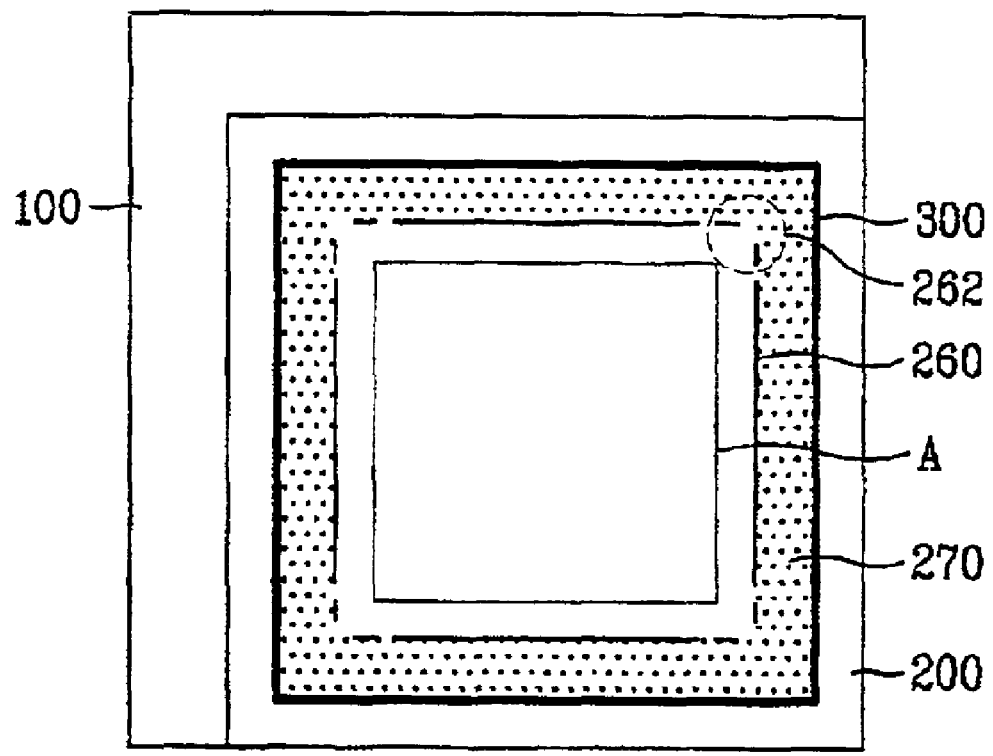
FIG. 11 illustrates a plane view of an LCD panel in accordance with a sixth embodiment of the present invention.

FIG. 11 illustrates a plane view of an LCD in accordance with a sixth embodiment of the present invention.

Referring to FIG. 11, the LCD panel according to the sixth embodiment of the present invention includes a dummy column spacer 260 having an opened portion 262. The opened portion 262 includes a plurality of openings in the corner-regions of the substrate. The opened portion 262 may be formed in at least one of the corner-regions. A plurality of openings may be formed at either a constant interval or an irregular interval. The others are similar to the fifth embodiment.

Figure 12A:
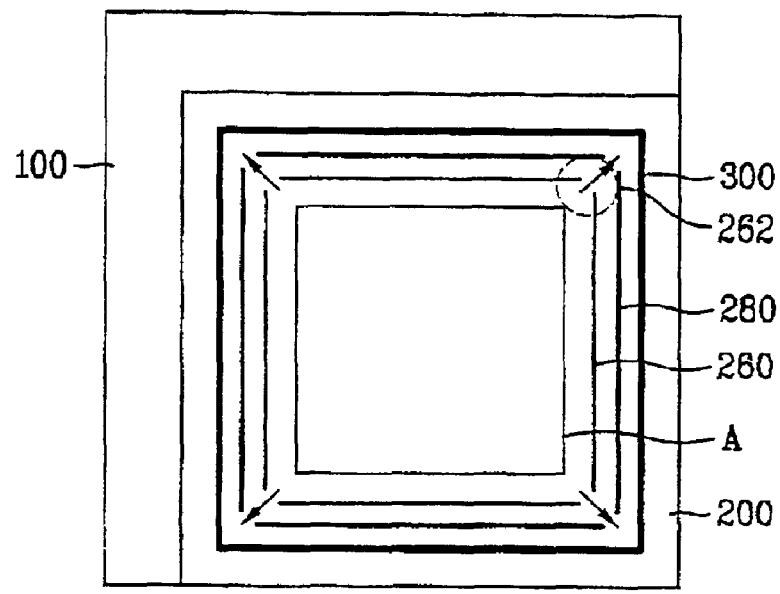
FIGS. 12A and 12B are plane views of an LCD panel in accordance with a seventh embodiment of the present invention.
Figure 12B:
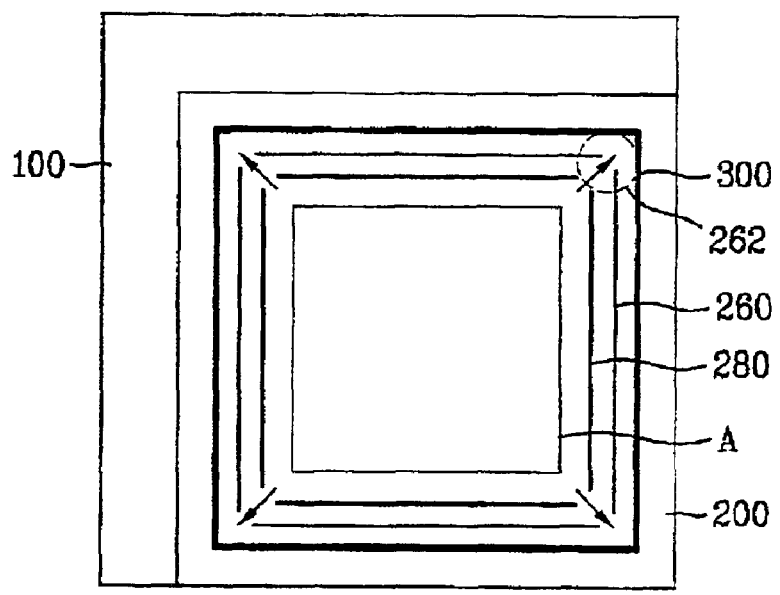

FIGS. 12A and 12B illustrate plane views of LCDs in accordance with a seventh embodiment of the present invention, wherein a second dummy column spacer 280 is additionally formed inside or outside a first dummy column spacer 260.

The dummy column spacer is duplicated for a better regulation of the liquid crystal flow. The first dummy column spacer 260 and/or the second dummy column spacer 280 may have the opened portion 262 in at least one of the corner-regions. The opened portion 262 may include a plurality of openings formed at either a constant interval or an irregular interval. The first dummy column spacer 260 and the second dummy column spacer 280 may be varied similar to the foregoing dummy column spacer 260 and the dotted line type dummy column spacer 270.

FIGS. 13A to 13D are perspective views illustrating a method for fabricating an LCD panel in accordance with an eighth embodiment of the present invention. Although the drawing illustrates only one unit cell, there may be more than one unit cell.

Figure 13A:
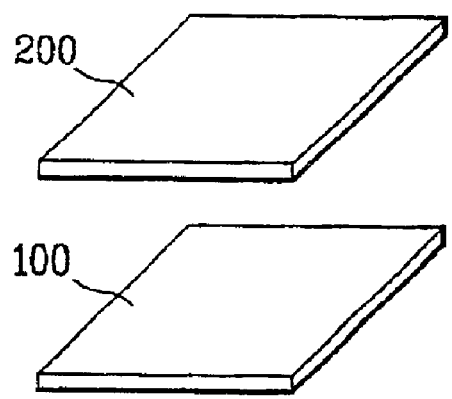
FIGS. 13A to 13D are perspective views illustrating a method for fabricating an LCD panel in accordance with an eighth embodiment of the present invention.

Referring to FIG. 13A, a lower substrate 100 and an upper substrate 200 are prepared for the process. A plurality of gate lines and data lines (both not shown) are formed on the lower substrate 100 to cross each other defining pixel regions. A thin film transistor having a gate electrode, a gate insulating film, a semiconductor layer, an ohmic contact layer, source/drain electrodes, and a protection film, is formed at every crossed point of the gate lines and the data lines. A pixel electrode is formed at each of the pixel regions connected to the thin film transistor.

An alignment film is formed on the pixel electrode for an initial orientation of the liquid crystal. The alignment film may be formed of one of polyimide, polyamide group compound, polyvinylalcohol (PVA), and polyamic acid by rubbing, or a photosensitive material, such as polyvinylcinnamate (PVCN), polysilioxanecinnamate (PSCN), or cellulosecinnamate (CelCN) group compound by photo-alignment.

A black matrix is formed on the upper substrate 200 for shielding a light leakage from the gate lines, the data lines, and the thin film transistors. A color filter layer of red, green, and blue is formed thereon. A common electrode is formed thereon. An overcoat layer may be additionally formed between the color filter layer and the common electrode.

Silver (Ag) dots are formed on the lower substrate 100, for applying a voltage to the common electrode on the upper substrate 200 after the two substrates 100 and 200 are bonded with each other. Alternatively, the silver dots may be formed on the upper substrate 200.

In an in-plane switching mode LCD panel, a lateral field is induced by the common electrode formed on the lower substrate the same as the pixel electrode. Thus, the silver dots may not be formed on the substrates. As shown in the first to eighth embodiments, the column spacer, the dummy column spacer, the dotted line type dummy column spacer, and the second dummy column spacer are formed on the various locations of the upper substrate 200. The column spacer and the dummy column spacer, the column spacer, the dummy column spacer, and the dotted line type dummy column spacer, or the column spacer, the dummy column spacer, and the second dummy column spacer may be formed of photosensitive resin at the same time with the same height (i.e., at the height of a cell gap). The foregoing alignment film is formed on the upper substrate 200.

Figure 13B:
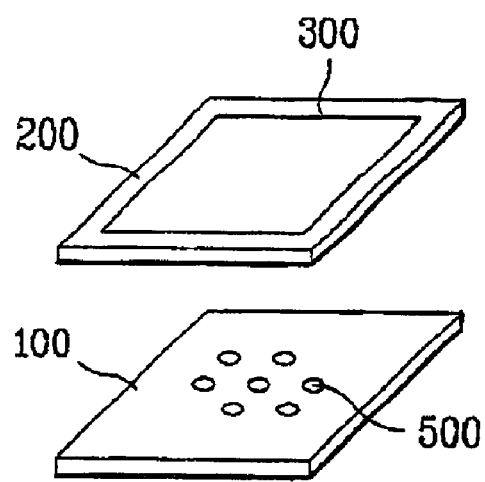

Referring to FIG. 13B, a UV sealant 300 is coated on the upper substrate 200. The sealant may be coated by using a dispensing method or a screen printing method. However, the screen printing method may damage the alignment film formed on the substrate since the screen directly contacts the substrate. Also, the screen printing method may not be economically feasible due to a large amount of the sealant loss for a large substrate.

For example, monomers or oligomers each having both ends coupled with an acrylic group mixed with an initiator, or monomers or oligomers each having one end coupled with an acrylic group and the other end coupled with an epoxy group mixed with an initiator is used as the UV sealant 300.

Then, a liquid crystal 500 is dispensed onto the lower substrate 100 to form a liquid crystal layer. A dispensed amount of the liquid crystal is determined with a substrate size and a cell gap. Generally, the liquid crystal is dispensed more than the determined amount.

The liquid crystal is contaminated once the liquid crystal contacts the sealant 300 before the sealant 300 is hardened. Therefore, the liquid crystal 500 is dispensed onto the central part of the lower substrate 100. A flow speed of liquid crystal 500 dispensed onto the central part is appropriately regulated by the dummy column spacer and the dotted line type dummy column spacer, thereby uniformly speeding the liquid crystal 500 inside of the UV sealant 300.

FIG. 13B illustrates that the liquid crystal 500 is dispensed on the lower substrate 100, and the UV sealant 300 is coated on the upper substrate 200. Alternatively, the liquid crystal 500 may be dispensed on the upper substrate 200, and the UV sealant 300 may be coated on the lower substrate 100.

Moreover, the liquid crystal 500 and the UV sealant 300 may be formed on the same substrate. The liquid crystal and the sealant may be formed on different substrates in order to shorten the fabrication time period. When the liquid crystal 500 and the UV sealant 300 are formed on the same substrate, there occurs unbalance in the fabricating processes between the substrate with the liquid crystal and the sealant and the substrate without the liquid crystal and the sealant. In addition, the substrate cannot be cleaned when the sealant is contaminated before the substrates are attached to each other since the liquid crystal and the sealant are formed on the same substrate. Therefore, after coating the UV sealant, a substrate cleaning step may be added.

Figure 13C:
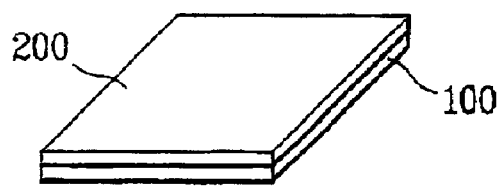

Referring to FIG. 13C, the lower substrate 100 and the upper substrate 200 are attached to each other. The lower substrate 100 and the upper substrate 200 may be bonded by the following processes. First, a liquid crystal is dispensed on one of the substrates. The other substrate is turned by 180 degrees so that the side of the substrate at the upper side having the liquid crystal layers faces into the upper surface of the substrate at the lower side. Thereafter, the substrate at the upper side is pressed, or the space between the substrates is evacuated, and releasing the vacuum, thereby attaching the two substrates.

Figure 13D:
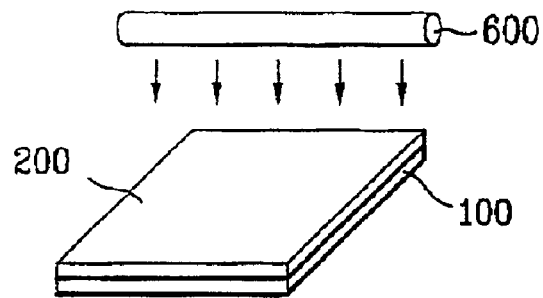

Then, referring to FIG. 13D, a UV ray is irradiated on the attached substrates by using a UV irradiating device. Upon irradiating the UV ray, monomers or oligomers are polymerized by the initiator in the UV sealant, thereby bonding the lower substrate 100 and the upper substrate 200.

Monomers or oligomers each having one end coupled to an acrylic group and the other end coupled to an epoxy group mixed with an initiator are used as the UV sealant 300. Since the epoxy group is not reactive with the UV irradiation, the sealant may have to be heated at about 120° C. for one hour after the UV irradiation for hardening the sealant.

In the meantime, the irradiation of the UV ray to the entire surface of the attached substrates may affect characteristics of devices, such as thin film transistors formed on the substrate, and alter a pre-tilt angle of the alignment film formed for an initial orientation of the liquid crystal.

Figure 14:
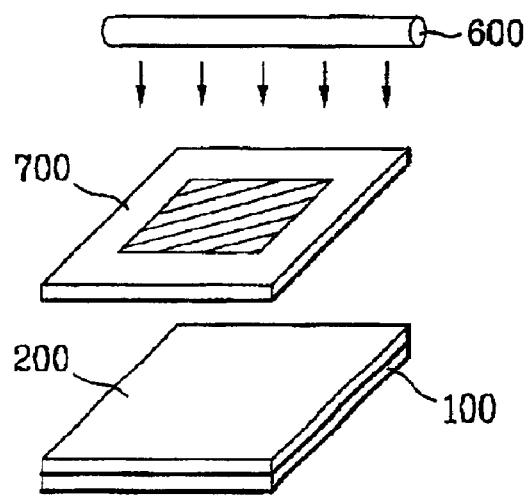
FIG. 14 is a perspective view illustrating irradiating a UV ray in a method for fabricating an LCD panel in accordance with the present invention.

Therefore, as shown in FIG. 14, the UV irradiation is carried out with masking the pixel regions inside the UV sealant 300 by a mask 700. Then, the bonded substrates are cut into unit cells. In the cutting step, after forming a scribing line (scribing process) on the surface of the bonded substrates by a scriber, such as a diamond pen with a hardness higher than the substrate, a mechanical impact is applied thereto along the scribing line by using a breaker (a break process), to obtain a plurality of unit cells at the same time.

Alternatively, a pen or wheel of diamond may be used to carry out the scribing and the breaking in one step, to obtain a unit cell one by one. A cutting device carrying out the scribing/breaking at the same time may be used in considering an occupied space of the cutting device and a required cutting time period.

Then, a final inspection is carried out after the cutting. In the final inspection, presence of defects is verified before the substrates cut into cell units are assembled into a module, by examining a proper operation of the pixels when a voltage applied thereto is turned on/off.

As explained previously, the LCD panel and the method for fabricating the same of the present invention have the following advantages.

The dummy column spacer and the dotted line type dummy column spacer, both having openings in the dummy region, control the liquid crystal flow, thereby maintaining a uniform cell gap and improving a picture quality.

The dummy column spacer and the dotted line type dummy column spacer serve as dams and prevent the liquid crystal from contacting the UV sealant.

It will be apparent to those skilled in the art that various modifications and variations can be made in the liquid crystal display panel and the method for fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display panel, comprising:

first and second substrates facing into each other;

a column spacer in a pixel region between the substrates;

a dummy column spacer formed in a dummy region between the substrates, the dummy column spacer having an opened portion in at least one of corner-regions;

a UV sealant formed outside the dummy column spacer between the substrates;

a dotted line dummy column spacer in one of inside the dummy region of the column spacer and outside the dummy region of the column spacer; and a liquid crystal layer between the substrates, wherein the dummy column spacer linearly extends continuously alone a major side length of the first and second substrates to control flow the liquid crystal layer.

2. The liquid crystal display panel of claim 1, wherein the opened portion includes a plurality of openings at a constant interval.

3. The liquid crystal display panel of claim 1, wherein the opened portion includes a plurality of openings at an irregular interval.

4. The liquid crystal display panel of claim 1, wherein the dotted line dummy column spacer is between the pixel region and the dummy region.

5. The liquid crystal display panel of claim 1, wherein the dotted line dummy column spacer is between the dummy region and the UV sealant.

6. The liquid crystal display panel of claim 1, further comprising a supplemental dummy column spacer adjacent to the dummy column spacer.

7. A liquid crystal display panel, comprising:

first and second substrates;

a plurality of gate lines and data lines on the first substrate to cross each other defining a pixel region;

a thin film transistor at each crossed point of the gate lines and the data lines;

a pixel electrode in the pixel region;

a black matrix on the second substrate;

a color filter layer on the black matrix;

a third layer on the color filter layer;

a column spacer in a pixel region between the substrates;

a dummy column spacer formed in a dummy region between the substrates, the dummy column spacer having an opened portion in at least one of corner-regions;

a UV sealant formed outside the dummy column spacer between the substrates;

a dotted line dummy column spacer in one of inside the dummy region of the column spacer and outside the dummy region of the column spacer; and a liquid crystal layer between the substrates, wherein the dummy column spacer linearly extends continuously along a major side length of the first and second substrates to control flow the liquid crystal layer.

8. The liquid crystal display panel of claim 7, wherein the third layer is a common electrode.

9. The liquid crystal display panel of claim 7, wherein the third layer is an overcoat layer.

10. The liquid crystal display panel of claim 7, wherein the dotted line dummy column spacer is between the pixel region and the dummy region.

11. The liquid crystal display panel of claim 7, wherein the dotted line dummy column spacer is between the dummy region and the UV sealant.

12. The liquid crystal display panel of claim 7, further comprising a supplemental dummy column spacer adjacent to the dummy column spacer.

* * * * *